(12) United States Patent
Williams (10) Patent No.: US 11,777,378 B2
(45) Date of Patent: Oct. 3, 2023

(54) MULTI-LANE MOTOR CIRCUITS

(71) Applicant: ZF Automotive UK Limited, Solihull (GB)

(72) Inventor: Connel Brett Williams, West Midlands (GB)

(73) Assignee: ZF Automotive UK Limited

( * ) Notice: Subject to any disclaimer, the term of this patent is extended or adjusted under 35 U.S.C. 154(b) by 720 days.

(21) Appl. No.: 16/881,665

(22) Filed: May 22, 2020

(65) Prior Publication Data

US 2020/0373819 A1  Nov. 26, 2020

(30) Foreign Application Priority Data

May 24, 2019  (GB) .................................... 1907403

(51) Int. Cl.
| | |
|---|---|
| *H02K 11/30* | (2016.01) |
| *H02K 11/33* | (2016.01) |
| *H02K 1/14* | (2006.01) |
| *H02K 1/2706* | (2022.01) |
| *H02K 3/52* | (2006.01) |

(52) U.S. Cl.
CPC ............. *H02K 11/33* (2016.01); *H02K 1/14* (2013.01); *H02K 1/2706* (2013.01); *H02K 3/521* (2013.01); *H02K 11/30* (2016.01)

(58) Field of Classification Search
CPC ........ H02K 1/27; H02K 1/2706; H02K 21/16; H02K 3/28; H02K 3/521; H02K 29/03; H02K 1/14; H02K 11/33; H02K 11/30
USPC .............................................. 310/68 D, 68 R
See application file for complete search history.

(56) References Cited

U.S. PATENT DOCUMENTS

| | | | | |
|---|---|---|---|---|
| 6,067,237 A | * | 5/2000 | Nguyen | ............ H02M 3/33584 363/41 |
| 7,154,237 B2 | * | 12/2006 | Welchko | ................. B60L 50/51 318/400.27 |
| 10,230,254 B1 | | 3/2019 | Najmabadi et al. | |
| 2009/0033253 A1 | * | 2/2009 | Nagashima | ............. B60L 15/00 320/137 |
| 2014/0292077 A1 | * | 10/2014 | Roesner | .................. B60R 16/03 307/10.1 |
| 2015/0069949 A1 | * | 3/2015 | Mohammadpour | .... H02P 25/22 318/724 |
| 2015/0171677 A1 | * | 6/2015 | Moon | .................. H02K 1/2706 310/156.38 |
| 2015/0314694 A1 | | 11/2015 | Alakula et al. | |
| 2018/0208236 A1 | | 7/2018 | Asao et al. | |

\* cited by examiner

*Primary Examiner* — Alexander A Singh
(74) *Attorney, Agent, or Firm* — Robert James Harwood (57) ABSTRACT

A motor apparatus includes a multi-lane permanent magnet synchronous motor having at least two sets of phase windings, and a control circuit. The control circuit selectively connects a first direct current power source to the motor phase windings of a first set of the motor phasing windings to form a first lane. The control circuit may also selectively connect a second direct current power source to the motor phase windings of a second set of the motor phasing windings to form a second lane. The control circuit may cause current to flow in the motor that meets a current demand from a current demand circuit. During at least one mode of operation, the control circuit may apply waveforms to a motor phase winding which causes an actively controlled transfer of energy from the first direct current source of the first lane into a component of the second lane.

15 Claims, 6 Drawing Sheets

MULTI-LANE MOTOR CIRCUITS

CROSS-REFERENCE TO RELATED APPLICATION

This application claims priority to UK Patent Application No. 1907403.8 filed May 24, 2019, the disclosure of which is incorporated herein by reference in its entirety.

TECHNICAL FIELD

This present disclosure relates to improvements in multi-lane motor circuits and in particular permanent magnet synchronous electric motors.

BACKGROUND

A permanent magnet synchronous motor PMSM comprises a stator comprising a set of teeth around which phases windings are wound in a defined pattern. Three phases are typical, the set of phases forming a lane. A rotor having a set of permanent magnets is arranged concentrically around the stator, or inside the stator. By applying AC drive waveforms to the phases, a magnetic field is produced which will rotate around the stator. The flux of the permanent magnets on the rotor interacts with this rotating magnetic field causing the rotor to rotate in synchronism with field. The AC currents generated in each of the phases may be constructed from a DC current source, such as a battery, using a drive circuit which applies a pulse width modulation technique. By varying the modulation, and particularly the phase of the waveforms the speed and torque of the motor can be carefully controlled.

The drive circuits typically comprise a set of switches that selectively connect each phase of the motor to the DC supply or to a ground or return rail. The opening and closing of the switches is controlled by a current demand circuit which supplies timing signals to the switches. The current demand circuit generates the switching patterns in accordance with a current demand signal which in turn may be generated as a function of a torque demand signal which represents the overall torque that is demanded from the motor.

PMSM motors a commonly used in electric power steering systems for vehicles because they are robust and can be driven from a vehicle battery. In an electric power steering system, the electric motor applies assistance torque to a part of the steering mechanism that helps a driver to turn the steering wheel. This has been proven to be a more efficient system than a traditional hydraulic steering system, and also brings additional benefits such as the ability to provide additional driven assistance functionality and being relatively simple to tune by a manufacture to give different steering feels using only modifications to software.

Multi-lane electric drives are becoming increasingly common to improve fault tolerance or to reduce and distribute power losses. Such systems may have one power supply per lane. Hence there are two batteries for a dual lane system in a fully robust vehicle application. A lane in the context of this description, and as commonly understood in the art, comprises a set of phase windings, an inverter circuit which applies the waveforms to each phase of the lane by selectively connecting the phase to a DC supply, and a current control circuit that generates the required PWM patterns for the switches of the inverter in response to a received current demand signal. In a dual-lane motor, there are two lanes.

In a fully independent system, each lane has its own control circuit which is completely independent of the control circuit for the other lane. In another arrangement, each lane may have its own inverter but the two lanes may share a common control circuit. In the context of this description, both arrangements fall within the scope of the term dual-lane PMSM motor. Also, for convenience the term dual-lane should be construed as including multi-lane motors that have more than two lanes, in so far as the motor does then include two lanes as well as the additional lanes. With more than two lanes there is, of course, a higher degree of fault tolerance but the principle of one lane providing a backup for one or more other lanes, or being able to share torque generating duties with other lanes, remains the same.

A PMSM motor with two or more lanes can be operated in a variety of different ways. In a dual lane motor, for example, a first one of the two lanes may be used to drive the motor in normal use with the second lane carrying no current and taking no part. If there is a fault in the first lane that is normally used, it may be turned off and the other lane used to drive the motor. In an alternative, both lanes are driven in normal use and in the event that one is faulty the motor may continue to run using the remaining non-faulty lane, albeit at reduced torque levels. There are some benefits in using both lanes in normal use, including the ability to reduce the power ratings of the switches in each lane as the peak torque each lane must deliver is lower than it would be if only one lane was required all the torque in normal operation.

SUMMARY

According to a first aspect the present disclosure provides a motor apparatus comprising:

a multi-lane permanent magnet synchronous motor having at least two sets of phase windings, a control circuit which selectively connects a first direct current power source to the motor phase windings of a first set of the motor phasing windings to form a first lane, and in which the control circuit is further configured to selectively connect a second direct current power source to the motor phase windings of a second set of the motor phasing windings to form a second lane, the control circuit being configured to cause current to flow in the motor to meet a current demand from a current demand circuit, in which during at least one mode of operation the control circuit is adapted to apply waveforms to one or more of the motor phase windings which cause an actively controlled transfer of energy from the first direct current source of the first lane into a component of the second lane through transformer coupling between at least one phase winding of the first lane and at least one phase winding of the second lane.

The at least one operating mode may be initiated in the event that a fault associated with the direct current source of the second lane is detected. By fault we may mean any occasion where it is determined that the current that may be drawn from the second direct current source is below an acceptable threshold, which includes instances where the battery is disconnected or where the battery is fully or partially depleted. The term fault also includes events where there is a break in the circuit between the second direct current source and the motor apparatus that prevents the current being drawn from the second direct current source. It also includes an event where a fault warning is raised even when the battery of the second current source is able to supply a demanded current, for instance where it is detected that the battery charge may not be able to sustain the current for a period of time. In a vehicle application this fault warning may be raised if the battery is in good health and charge but the alternator that is responsible for replenishing the charge is faulty.

The motor apparatus may comprise a current demand circuit which generates a respective current demand signal for each lane of the motor indicative of the current to be applied to each set of phase windings of the motor.

The motor apparatus may comprise a first drive circuit which forms part of the first lane and which comprises a plurality of switches which selectively connect the first direct current power source for the first lane to the phases of the first set of phase windings to cause current to flow in one or more of the phases of the first lane of the motor demanded by the current demand circuit, and a second drive circuit which comprises a plurality of switches which selectively connect the second direct current power source to the phases of a second of the two lanes to cause current to flow in one or more of the phases of the second lane of the motor demanded by the current demand circuit.

During a normal mode of operation the current demanded by the current demand circuit may be split across the two lanes, preferably split equally. Alternatively, during normal operation one lane may act as a master and meet the whole current demand and the other as a slave and not make a contribution to the current demand.

The motor apparatus may include a battery event monitoring circuit which detects a drop in voltage at an input to the second lane associated with a discharged or disconnected battery to determine when a battery event has occurred. The battery event monitoring circuit may output a trigger signal which is supplied to the control circuit that initiates operation in the at least one mode of operation, i.e. the fault mode of operation. Once initiated energy will be transferred from the first lane to the second lane.

The motor apparatus may receive the trigger signal indicating when a transfer of energy is required and enter the one mode of operation when that signal is received and exit that mode to cease the transfer of energy once the trigger signal is removed.

The trigger signal may indicate a required rate of transfer of energy or an amount of energy to be transferred and the control circuit may modify the current demand from each lane to deliver the required rate or required amount of transferred energy.

In a preferred arrangement the motor apparatus may be configured such that in the at least one mode of operation where a torque is demanded from the motor, the current demand circuit may be adapted to cause the first drive circuit to apply waveforms to the phases of the first lane which generate a positive torque from the first lane and to simultaneously cause the second motor drive circuit to apply current waveforms for one or more of the motor phases of the second lane which generate a negative torque from the second lane, and where the sum of the two torques is equal to the demanded torque.

The current demand circuit may cause the two lanes to generate alternating waveforms for each phase of both lanes, the phase of the waveforms relative to the motor rotor electrical position setting the sign of the torque that is generated from each lane.

By applying both a positive torque and a negative torque at the same time using the two lanes simultaneously, power may be transferred from one battery to the other without affecting the function of the motor apparatus using inductive coupling between the windings. This exploits the principle that an alternating current flowing in the one winding of the first lane will generate a varying magnetic field, which in turn induces a varying electromotive force emf in a winding of the second lane provided that they are closely spaced from each other. This is the identical principle used in a simple power transformer.

The motor may be arranged such that at least one winding of the first lane is adjacent or interleaved with at least one winding of the second lane.

The motor may comprise a stator having a plurality of teeth, a phase winding of the first lane being arranged in multiple turns around one of the teeth and a phase winding of the second lane being arranged in multiple turns around the same or an adjacent tooth of the stator. These coils may provide the path for the power transfer in the event of a fault.

The motor apparatus may be adapted to operate during a normal mode of operation whereby currents are applied to the motor phases to generate a torque that corresponds to a demanded motor torque that is input to the control circuit. In this mode, the motor apparatus by drive only the first lane to provide torque from the motor and the second lane may be inactive and provide zero torque, i.e. the current demand for the second lane may be zero during normal operation. The first lane therefore acts alone during normal use with the second lane providing a backup only in the event of a fault at the first lane.

The current demand circuit may in the event of the at least one (fault) mode of operation, i.e. not during normal operation, modify the current demands for each lane that are generated during normal operation to cause the energy transfer, or replace the current demands that would be used during normal operation with different current demands, or to generate only different current demands (no modification).

The current demand signals that are used during a normal mode may be modified such that they provide a positive torque in the first lane and a negative torque in the second lane by adding to the first lane an additional current demand amount that is equal in magnitude to the negative current demand for the second lane, such that the application of the negative torque to the second lane does not alter the overall torque output of the motor.

During normal operation both the first and second lane may both be driven so as to provide a positive torque from each lane, the sum of the torques matching the torque demand. The two lanes may apply the same torque and may be driven by identical current demand signals so that they each provide half of the demanded torque during the normal mode.

In this arrangement, in the operating mode where power is to be transferred to the second lane, the current demands for each lane may be modified such that the first lane has a positive torque and the second lane produces a negative torque.

The energy transferred from the first lane during the at least one operating mode, such a battery fault, may transfer energy to the dc current supply of the second lane, or transfer energy to a DC link capacitor of the second lane where there is no dc current supply present on the second lane, for instance if a battery has been disconnected.

The DC link capacitor may be provided between the supply rails of the battery of the second lane as is known by the person skilled in the art.

Providing a DC link capacitor and transferring power to it in this manner may be beneficial as it may enable circuitry that is powered by the battery of the second lane to remain functional when the battery is removed.

The apparatus may be arranged during the at least one operation mode to apply a currents that produce a positive torque from the first lane and a negative torque from the second lane that together sum to zero allowing power to be transferred with the motor not rotating, allowing energy transfer when the motor is stationary. This may be especially useful in a steering system as it will allow energy to be transferred when the steering is stationary.

The motor apparatus may include a modified torque demand generator which produces for each lane a respective modified torque demand signal in response to the overall torque demand signal. The modified torque demand signal for each lane may then be fed to a respective current demand subcircuit for each lane. This modification of the torque demand upstream of the current demand circuit allows a simple form of current demand circuit to be used for each lane.

In an alternative, the current demand circuit may comprise for each lane a respective current demand sub circuit, each current demand sub circuit receiving the same torque demand signal and producing a respective current demand signal for each lane. The output of each current demand sub circuit may be modified in the event of a fault to provide modified current demand signals for each lane which differ from those used during normal operation.

The current demand circuit may include a dq axis current controller which may receive the current demand signal for the lane and from these produce respective PWM waveforms for each lane. Where each lane typically has three phases, these waveforms will produce currents which in normal use typically comprise three phase alternating current waveforms. The modification may be made in the stage when the dq current demands are converted to the three phase signals or upstream by modifying the dq current demand signals.

Where the modification of the current demands is made at the stage where the dq current demands are converted to the individual phase currents there is more scope for tailoring the current waveforms used in the fault more of operation.

In some cases, there may be waveforms actively applied to only one phase of the first lane which is inductively coupled to a phase of the second lane with these currents being totally independent of the torque demand and the current demand. In this case, the motor will no longer operate to produce torque. However, this is perfectly acceptable if the motor would normally be stationary at this time where no torque is demanded.

The present disclosure may extend to operating in a further mode of operation in which energy is transferred from the second lane to the first lane in the event of a fault of the first lane associated with the DC power source of the first lane. This requires that the status of the dc power source of the first lane is monitored as well as the second lane DC power source, and a suitable fault alert being raised.

Therefore, the motor apparatus may be arranged such that during a further mode of operation the control circuit is adapted to apply waveforms to one or more of the motor phase windings which cause energy to be transferred from the second direct current source of the second lane into a component of the first lane through transformer coupling between at least one phase winding of the first lane and at least one phase winding of the second lane.

The motor apparatus may form a part of a steering system this enables energy to be transferred when the steering is not moving, perhaps when the vehicle is parked or left with the ignition switched off. It is common for a battery to be removed when the vehicle is switched off, for repair or replacement or for general safety when working on the vehicle. In this case, energy may be transferred to the lane with the battery removed.

The motor apparatus may therefore define a part of a vehicle power steering system and may include a first battery fitted to a vehicle that defines a first direct current source and a second battery fitted to the vehicle that defines a second direct current source. The output of the motor may be connected mechanically to a steering column shaft or a steering rack of a vehicle or other part of a steering mechanism such that torque output from the motor may assist the driver in steering the vehicle.

In a steering system it is desirable to control the torque across the two lanes in a fault so that the transfer of energy between lanes is not felt by the driver as a change in torque. However, in some cases a reduction in torque assistance may be considered acceptable.

Transferring energy when the steering motor is stationary may produce a noise from the motor, but this may be acceptable if they transfer of power is required for an emergency purpose such as ensuring that the second lane is always powered up and ready for use when the vehicle ignition is turned ON.

The applicant has appreciated that the ability to transfer power when the motor is not moving by transformer coupling may be especially beneficial in a steering system which does not include a physical position sensor to detect the motor rotor position.

According to a second aspect the present disclosure provides a control circuit for use in combination with a dual lane permanent magnet synchronous motor, in which the control circuit selectively connects a first direct current power source to the motor phase windings of a first set of the motor phasing windings to form a first lane, and in which the control circuit is further configured to selectively connect a second direct current power source to the motor phase windings of a second set of the motor phasing windings to form a second lane, the control circuit being configured to cause current to flow in the motor that meets a current demand from a current demand circuit, in which the control circuit is adapted to apply current waveforms to one or more of the motor phases which cause energy to be transferred from the first direct current source of the first lane into a component of the second lane through transformer coupling between at least one winding of the first lane and at least one winding of the second lane.

According to a third aspect the present disclosure provides a method of controlling a multi-lane permanent magnet synchronous motor having at least two sets of phase windings, comprising selectively connecting a first direct current power source to the motor phase windings of a first set of the motor phasing windings to form a first lane, selectively connect a second direct current power source to the motor phase windings of a second set of the motor phasing windings to form a second lane, whereby to cause current to flow in one or more of the two sets of phase windings to cause a current to flow in the motor that meets a current demand from a current demand circuit, the method further comprising during at least one mode of operation applying voltage waveforms to one or more of the motor phase windings which cause energy to be transferred from the first direct current source of the first lane into a component of the second lane through transformer coupling between at least one phase winding of the first lane and at least one phase winding of the second lane.

The method may comprise during a normal mode of operation causing current to flow through both lanes to meet a overall current demand in the motor and in the at least one mode of operation causing currents to flow that generate a positive torque in the motor from one lane and a negative torque in the motor from the other lane whilst maintaining the same overall current demand.

The method may actively transfer energy from one lane to the other without affecting the current or torque of the motor. This is possible by controlling the motor so that one lane is motoring-positive torque at the same time the other is generating-negative torque, and by balancing the two to ensure there is no change in overall torque.

The method may actively transfer energy when the motor is stationary by generating a net zero overall torque.

BRIEF DESCRIPTION OF THE DRAWINGS

There will now be described, by way of example only, two embodiments of the present disclosure of which.

DETAILED DESCRIPTION

Figure 1:
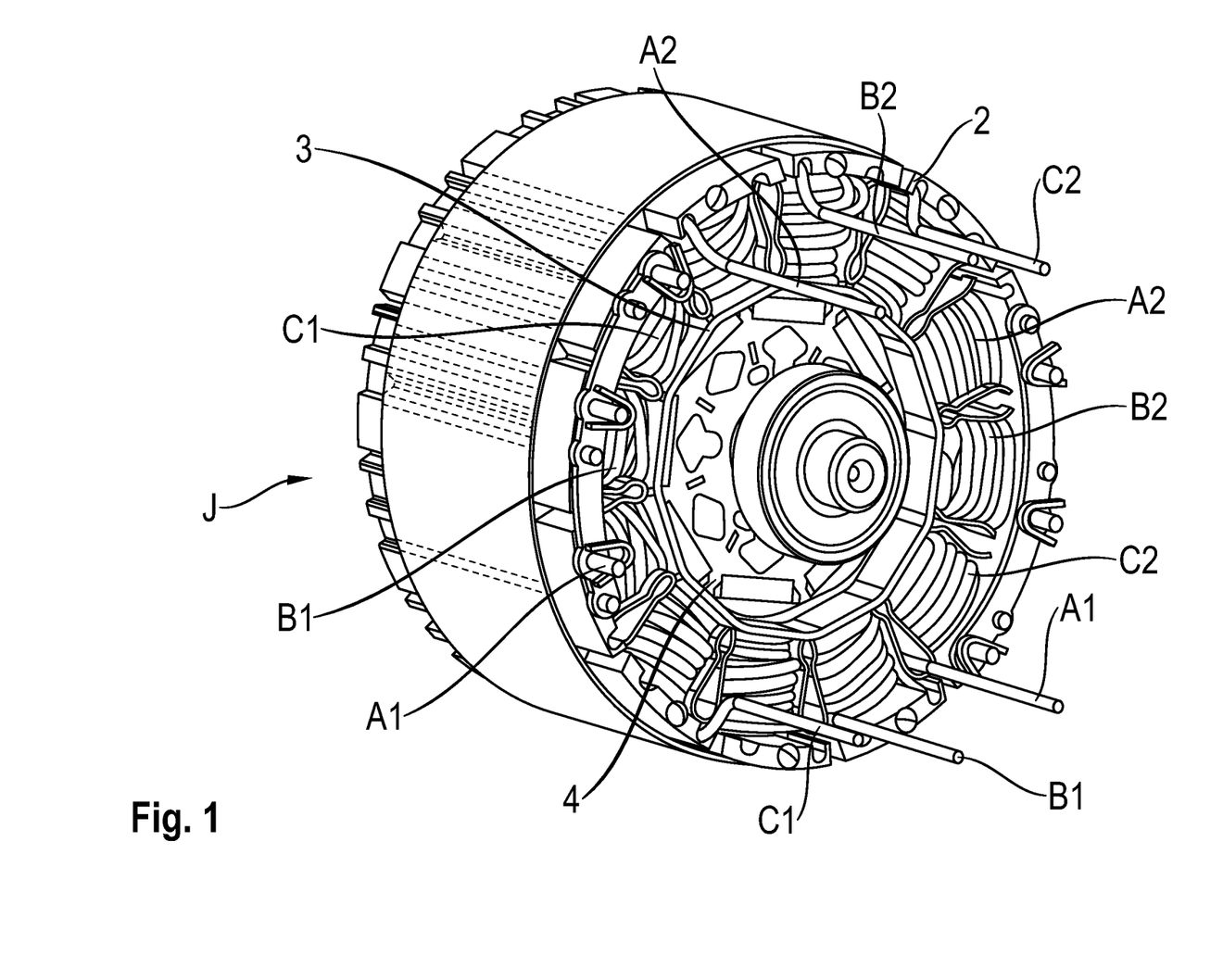
FIG. 1 is a perspective cut away diagram showing the topology of a motor that may be used in a motor apparatus in accordance with the present disclosure.

As shown in FIG. 1, a dual lane PMSM motor 1 which can be used in an embodiment of the present disclosure comprises a stator 2 and a rotor 3 arranged concentrically around a common axis. As shown the rotor 2 is inside of the stator 110 but it could be located around the outside of the stator. The motor is also shown schematically in FIG. 10 of the drawings. The motor is a dual lane motor because it has two sets of independent phase windings. The present disclosure can be applied to motors with more than two lanes. The rotor 3 comprises a carrier in which is embedded a plurality of permanent magnets 4. As shown each magnet 4 is located in a slot in the rotor carrier with 8 magnets in total in the exemplary motor.

The stator 3 comprises a plurality of teeth spaced around the stator, each one surrounded by multiple turns of electrical wire. There are 12 teeth in total. Each one is wound by wire corresponding to a single phase of a lane of the motor, with each lane comprising three phases. In the illustrated motor, the wire for each phase is wound around two teeth of the stator.

The location of the windings of each lane is significant. Each lane has three phases, A, B and C, although the skilled person will understand that there may be more than three in each lane, with the phases of a first lane indicated with a 1, e.g. A1, and of the second lane with a 2, e.g. A2. It can be seen that all of the phases windings for the first lane are on the lower left half of the motor stator, and for the second phase are on the upper right half of the motor. This ensures that two windings from the first lane are adjacent to a winding of the second lane. In the example of FIG. 1, it can be seen that one of the sets of turns formed by the wire of phase A1 is adjacent to a set of turns of a wire forming phase C2. Similarly, one of the sets of turns of phase C1 is adjacent to a set of turns A2.

Figure 2:
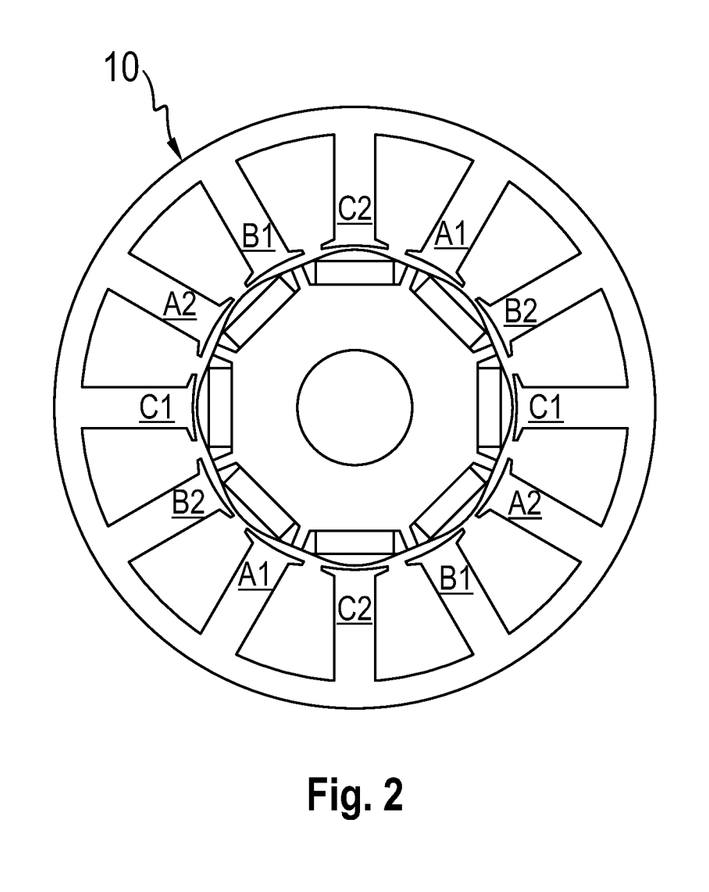
FIG. 2 is a schematic view of an alternative suitable motor topology.
Figure 3:
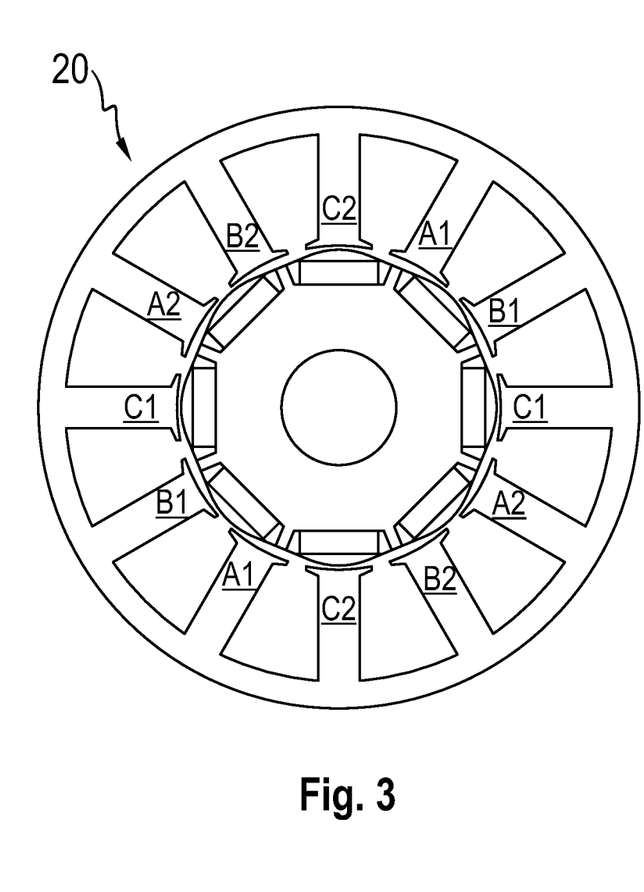
FIG. 3 is a schematic view of a further alternative suitable motor topology.

FIGS. 2 and 3 show other suitable motor topologies for motors 10, 20. In each case, there are windings of the first lane adjacent windings of the second lane. This arrangement makes it possible for current flowing in a winding of one lane to induce a current in the adjacent winding of the other lane. In a modification not shown, the windings of the first lane may be provided around the same tooth as the windings of the second lane rather than being around adjacent teeth.

Figure 4:
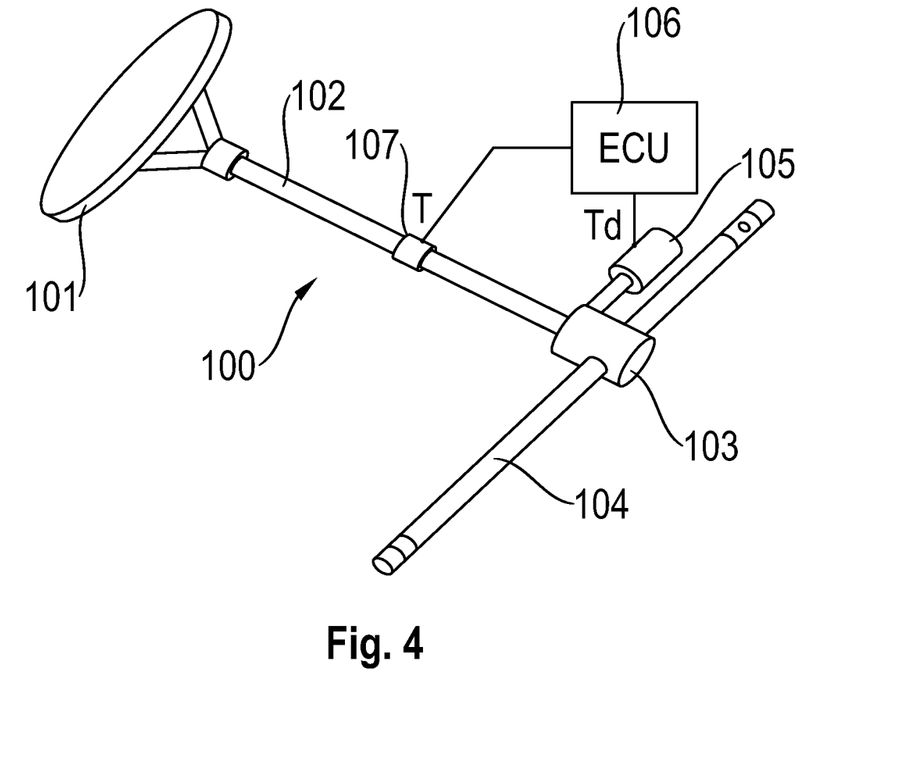
FIG. 4 is a schematic diagram of the main components of an electric steering apparatus that incorporates a motor apparatus in accordance with the present disclosure.
Figure 5:
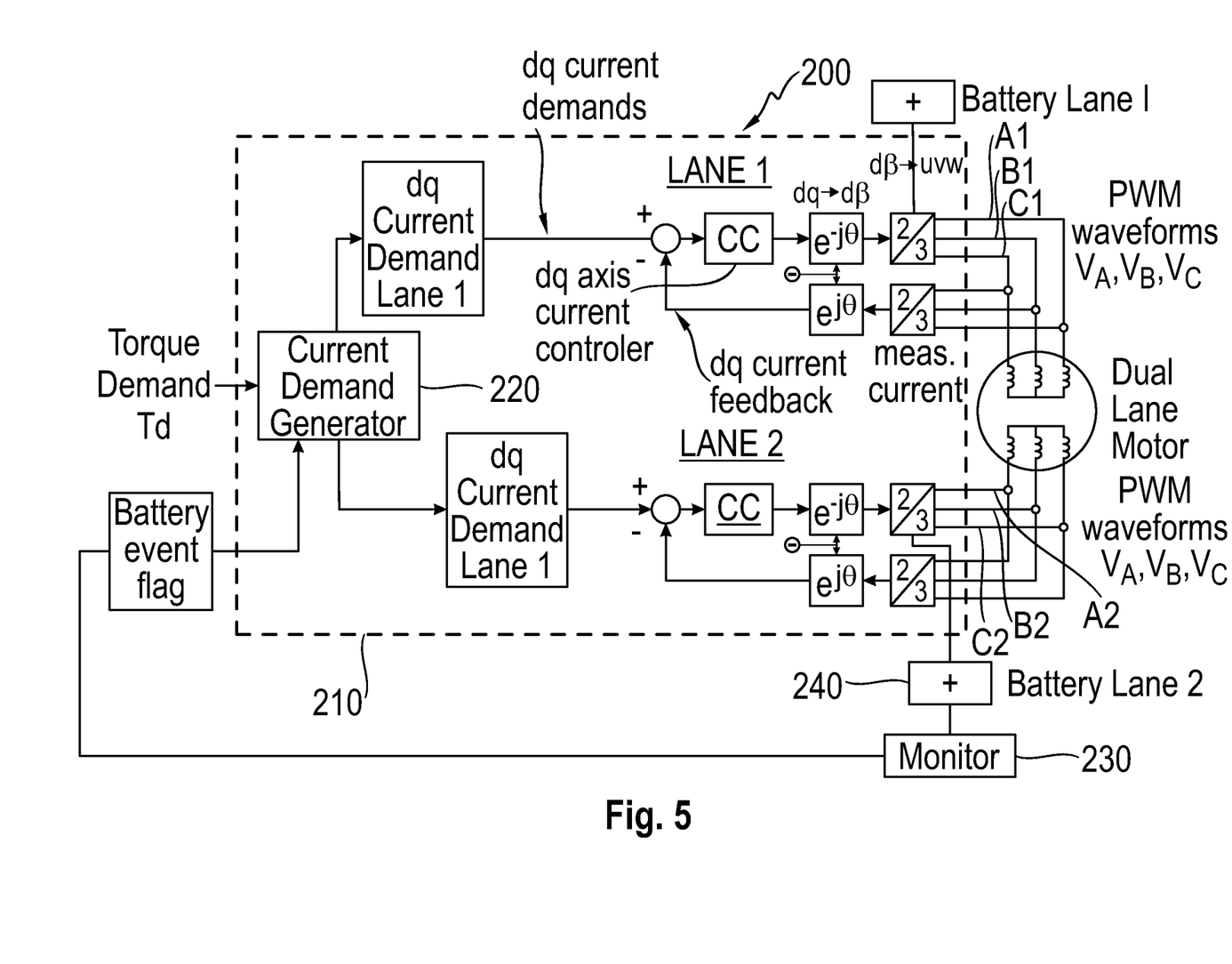
FIG. 5 is a detailed view of the circuitry of a first embodiment of a motor apparatus suitable for use in the electric steering apparatus of FIG. 4 which falls within the scope of the present disclosure.
Figure 6:
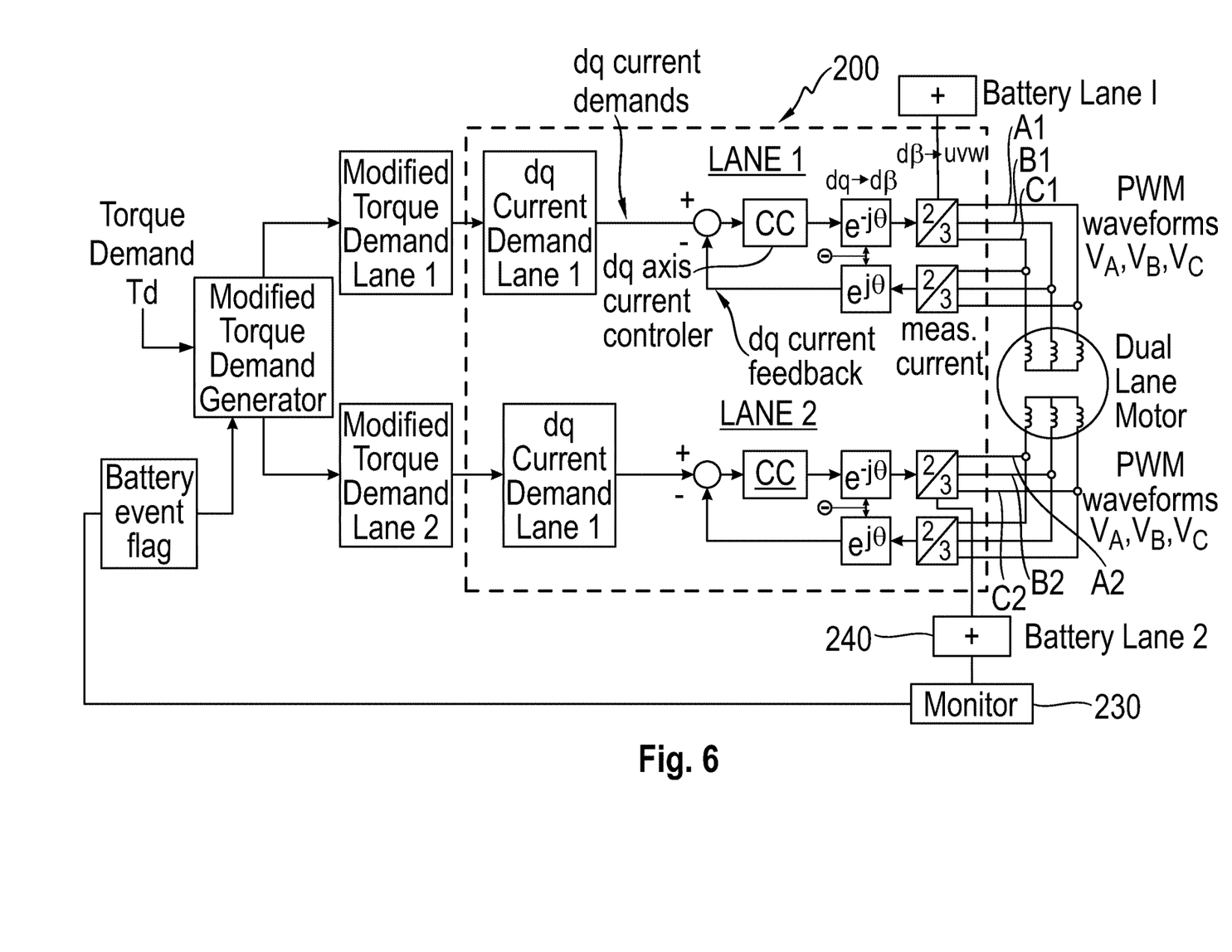
FIG. 6 is a detailed view of the circuitry of a first embodiment of a motor apparatus suitable for use in the electric steering apparatus of FIG. 4 which falls within the scope of the present disclosure.
Figure 7:
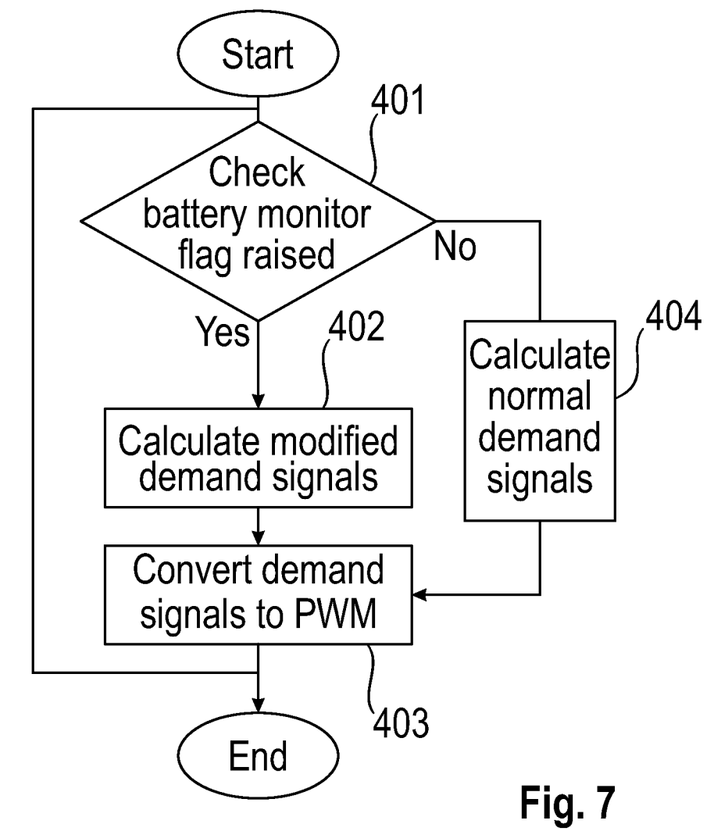
FIG. 7 is a flow diagram setting out the logic that may be applied by the motor apparatus during normal operation and in the event of a battery fault or other event.

FIG. 4 is an overview of a steering apparatus 100 for a vehicle which may incorporate a motor of FIGS. 1 to 3. This steering apparatus incorporates a motor apparatus such as is shown in FIGS. 5 and 6. The steering apparatus 100 comprises a steering wheel 101 which is connected through a steering shaft 102 to a gearbox 103 that is in turn connected to a steering rack 104. A motor apparatus 105 acts on the steering shaft through the gearbox or a second gearbox, and this is supplied with signals from an ECU 106. The ECU receives a torque signal T output from a torque sensor 107 that senses the torque carried by the steering shaft. The ECU generates a torque demand signal Td that is fed to the motor apparatus 105 that indicates the level of torque the motor apparatus is to provide to help the driver to turn the steering wheel.

The skilled person will appreciate that other arrangements are possible. The motor apparatus 105 may act directly onto the steering rack 104 rather than acting on the steering shaft 102. The steering shaft 102 may be discontinuous so that it is not physically connected to the steering rack but instead only connects to the steering wheel to provide a steer by wire steering system. In this case the torque sensor 107 will still be provided to measure the torque input through the steering wheel.

FIG. 5 is a control block diagram of a first embodiment of a complete motor apparatus 200 in accordance with a first aspect of the present disclosure. As shown the motor apparatus 200 includes control circuit 210 which receives at an input a torque demand signal and which outputs AC current waveforms for the phases of motor such as the motor in FIG. 1, 2 or 3. The torque demand value Td may be generated remote from the motor apparatus 200, for instance by the ECU shown in FIG. 4. Alternatively this ECU may be provided as a part of the motor apparatus.

The control circuit comprises a current demand generator part 220 which generates a respective current demand signal 230,240 for each lane, labeled Current demand Lane 1 and Current demand Lane 2, indicative of the current to be applied to the motor to cause it to produce the demanded torque set by the torque demand signal. The current demand generator part 220 receives the torque demand signal Td. A look up table LUT1, not shown, may be used to generate the appropriate value for the current demand signal for each lane. This may take into account the motor speed and rotor position. The value is then converted into the dq axis as a dq axis current demand signal for each lane.

In this example both lanes are identical, apart from the location of the stator teeth around which the phases are wound, the same current demand signal may in fact be used for both lanes during normal operation to generate the motor torque, with each lane nominally generating one half of the motor torque. As will be explained below, the current demand circuit may, however, modify the current demand signal supplied to each lane under at least one operating mode to enable the transfer of energy from one lane to the other.

The current demand signals in the example of FIG. 5 are dq signals in the rotating frame of reference of the motor rotor. These are converted by a part of the current demand circuit into the AB frame of reference of the stator, and from there into the current waveforms for each phase of the lane. In the example with three phases per lane this leads to three current waveforms for each lane. In normal use these are synthesised by applying PWM modulation patterns that are used to control the switches of a drive stage bridge.

Figure 8:
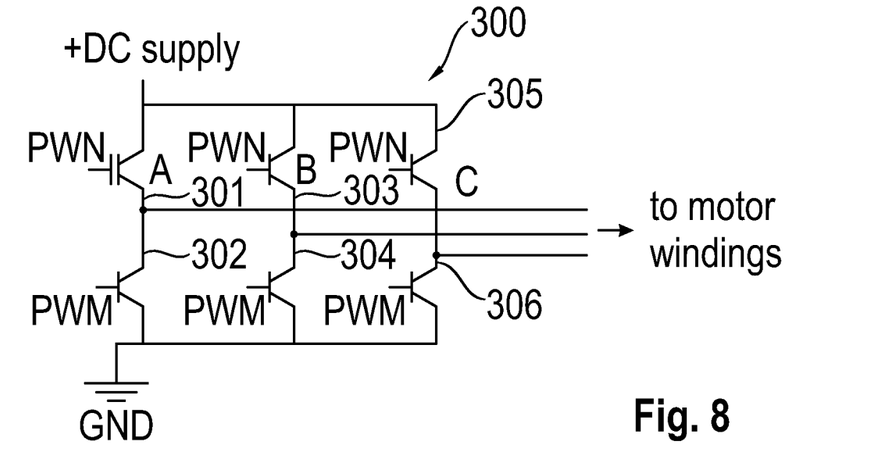
FIG. 8 is a diagram showing the switch arrangement for a suitable drive stage for each lane.

An exemplary drive stage bridge 300 is shown in FIG. 8 of the drawings. As can be seen there are three pairs of switches with one pair 301,302;303,304; 30,306 for each lane, six in total. Each pair has an upper switch connecting the phase to the DC supply source, and a lower switch connecting the phase to a ground for that supply. There will be two drive stage bridges, one for each lane. In this example they are identical. Each switch 301-306 is opened and closed according to the applied PWM modulation pattern generated by the current demand circuit. The skilled person will be familiar with a wide range of different patterns that may be used and so they will not be described here in any detail.

With the arrangement of windings of the motor of FIG. 1, 2 or 3 it can be seen that for a dual lane system it is possible to transfer energy between the power supplies of lane 1 and 2 because of inductive coupling between the windings of the lanes if appropriate current waveforms are applied to the motor phases.

The motor apparatus of FIG. 5 is configured to operate in a mode where energy is transferred from lane 1 to lane 2. When the motor shown in FIG. 1 is rotating in the positive direction demanding a positive torque from lane 1 means that lane 1 will be motoring. Demanding a negative torque from lane 2 means that lane 2 will be generating. Hence there will be a net flow of electrical energy from the lane 1 DC power supply (battery lane 1) into the lane 2 DC power supply (battery lane 2). Provided that the overall torque, equal to the sum of the torques from the two lanes, matches the overall torque demand, this transfer of energy can be achieved without any noticeable effect on the function of the motor in terms of torque performance.

The total output torque of the motor that is possible in this mode of operation will be reduced compared with that possible when both lanes are contributing a positive torque, and the motor may heat up more quickly than normal. However for situations when full torque is not required this is not a significant concern.

It is also possible for a dual lane system to transfer energy between the power supplies of lane 1 and 2 when the motor is stationary. For example, in the motor to the right lanes 1 and 2 of the motor are closely magnetically coupled, particularly between teeth A1 and C2, and between teeth C1 and A2. Therefore, by applying a high frequency AC field on teeth A1 and C1, and applying a rectifying control onto teeth A2 and C2 it would be possible to transfer energy from lane 1 to lane 2 via transformer coupling. This could be reduced significantly by using the additional degrees of freedom of control from the remaining phases combined with a measurement of motor position to actively cancel out this ripple. As with all transformer-based power transfer systems there would be some residual vibration which could lead to NVH.

A logic that may be applied by the motor apparatus of FIG. 5 is illustrated in FIG. 6 of the drawings. In a first step 401, an output from a battery monitor 230 which monitors a DC power source, for example battery 240, of lane 2 is checked. The output may comprise a flag which is raised when the monitor detects a fault. This may occur where a battery event has happened such as removal of the battery. If it has not, then in step 402 no modification of the current demand signals is made and the motor is driven in a normal manner with one lane generating positive torque and the other OFF, or both sharing the positive torque generation. In Step 403, the two current demand signals are converted into the drive stage switch PWM signals as usual in a normal operation. After an elapsed time period, the logic will return to the first step to close a loop and the battery event flag will be checked. If it is noted that a battery event has occurred, the apparatus will perform an alternative set of PWM currents that cause lane 1 to transfer energy to lane 2. As shown, in the example of FIG. 5 the motor apparatus will in step 404 modify the current demand signals to the two lanes such that a transfer of energy to the second lane is provided. Step 403 is then applied and the modified current demand signals are converted into the drive stage switch PWM signals.

The current demand signals may be modified to maintain the overall motor torque or to stop providing torque and instead prioritize energy transfer from lane 1 to lane 2. If the motor is stationary, it will transfer energy without producing continuous rotation of the steering wheel. After step 405, the logic will again loop back to step 1. This may continue until the motor apparatus is turned off and the logic process ends.

The motor apparatus of FIG. 5 modifies the current demands when there is a battery fault event or at any other time where it is required to transfer energy to the second lane. This is initiated in response to receiving a fault event signal at an input to the current demand circuit and including logic within the current demand circuit that modifies the current demands for each lane when the fault event signal is received.

The skilled person will understand that the term modified in the context of this specification is intended to cover the case where a current demand signal is calculated and then changed by adding or subtracting or performing some other arithmetic or logical function. It is also intended to cover the case where there is no current demand signal that is replaced or changed but instead a current demand signal is calculated which his different from that which would be used in a normal operation. The modification in that sense refers to the fact that the current demand signal is simply different or changed from that which is used in the normal mode of operation.

In an alternative embodiment of a motor apparatus 400 shown in FIG. 6, the torque demand signal that is supplied to the current demand signal for each lane is modified rather than modifying the current demands. The logic for making the modifications in the event of a fault is therefore built into a Modified Torque demand signal part 410 that outputs a respective modified torque demand signal 420, 430 for lane 1 and lane 2. This part is upstream of each current demand circuit, so that the current demand circuit is unaware that it is operating in a fault mode or a normal mode. During the normal mode, the torque demand signal supplied to each lane may be the same if they share the torque output, or only lane 1 may be supplied with the torque demand signal in normal operation.

In a still further alternative, the current demand circuit for each lane may not modify the current demand signal but may instead in the event of a fault apply a completely different set of current waveforms to the phases of each lane which are independent of the torque demand signal value.

The skilled person will understand that apparatus used to transfer of energy from lane 1 to lane 2 may be arranged to also transfer power from lane 2 to lane 1 when needed, for instance if there was a fault associated with the battery of lane 1.

What is claimed is:

1. A motor apparatus comprising:
   a multi-lane permanent magnet synchronous motor having at least two sets of phase windings,
   a control circuit configured to selectively connect a first direct current power source to the motor phase windings of a first set of the motor phasing windings to form a first lane, and
   to selectively connect a second direct current power source to the motor phase windings of a second set of the motor phasing windings to form a second lane,
   wherein the control circuit is configured to cause current to flow in the motor that meets a current demand from a current demand circuit, and
   wherein during at least one mode of operation the control circuit is adapted to apply waveforms to one or more of the motor phase windings which cause an actively controlled transfer of energy from the first direct current source of the first lane into a component of the second lane through transformer coupling between at least one phase winding of the first lane and at least one phase winding of the second lane, and
   wherein the at least one mode of operation may be initiated in the event that a fault associated with the second direct current source of the second lane is detected.

2. The motor apparatus according to claim 1 in which the motor apparatus further comprises a current demand circuit which generates a respective current demand signal for each lane of the motor indicative of the current to be applied to each set of phase windings of the motor.

3. The motor apparatus according to claim 2 that comprises a first drive circuit which forms part of the first lane and which comprises a plurality of switches which selectively connect the first direct current power source for the first lane to the phases of the first set of phase windings to cause current to flow in one or more of the phases of the first lane of the motor demanded by the current demand circuit, and a second drive circuit which comprises a plurality of switches which selectively connect the second direct current power source to the phases of a second of the two lanes to cause current to flow in one or more of the phases of the second lane of the motor demanded by the current demand circuit.

4. The motor apparatus according to claim 1 in which during a normal mode of operation the current demanded by the current demand circuit is split across the two lanes.

5. The motor apparatus according to claim 4 which further includes a battery event monitoring circuit which detects a drop in voltage at an input to the second lane associated with a discharged or disconnected battery to determine when a battery event has occurred.

6. The motor apparatus according to claim 4 configured such that in the at least one mode of operation where a torque is demanded from the motor, the current demand circuit causes the first drive circuit to apply waveforms to the phases of the first lane which generate a positive torque from the first lane and causes the second motor drive circuit to apply current waveforms for one or more of the motor phases of the second lane which generate a negative torque from the second lane, where the sum of the two torques is equal to the demanded torque.

7. The motor apparatus according to claim 4 which is arranged such that during a normal mode of operation currents are applied to the motor phases to generate a torque that corresponds to a demanded motor torque that is input to the control circuit.

8. The motor apparatus according to claim 7 arranged in the fault mode of operation to modify the current demands for each lane that are generated during normal operation.

9. The motor apparatus according to claim 7 whereby during normal operation both the first and second lane are driven so as to provide a positive torque from each lane, the sum of the torques matching the torque demand.

10. The motor apparatus according to claim 9 arranged during the at least one operation mode to generate a positive torque using the phases of the first lane and a negative torque using the phases of the second lane that together sum to zero allowing power to be transferred with the motor not rotating to cause energy transfer when the motor is stationary.

11. The motor apparatus according to claim 10 in which during at least one mode of operation the control circuit is adapted to apply waveforms to one or more of the motor phase windings which cause energy to be transferred from the first direct current source of the first lane into a component of the second lane through transformer coupling between at least one phase winding of the first lane and at least one phase winding of the second lane.

12. A control circuit for use in combination with a dual lane permanent magnet synchronous motor comprising:
    a control circuit configured to selectively connect a first direct current power source to the motor phase windings of a first set of the motor phasing windings to form a first lane, and
    to selectively connect a second direct current power source to the motor phase windings of a second set of the motor phasing windings to form a second lane,
    wherein the control circuit is configured to cause current to flow in one or more of the two sets of phase windings that meets a current demand from a current demand circuit, and
    wherein the control circuit is adapted to apply current waveforms to one or more of the motor phases which cause energy to be transferred from the first direct current source of the first lane into a component of the second lane through transformer coupling between at least one winding of the first lane and at least one winding of the second lane, and
    wherein at least one operating mode may be initiated in the event that a fault associated with the second direct current source of the second lane is detected.

13. A method of controlling a multi-lane permanent magnet synchronous motor having at least two sets of phase windings, comprising
    selectively connecting a first direct current power source to the motor phase windings of a first set of the motor phasing windings to form a first lane,
    selectively connecting a second direct current power source to the motor phase windings of a second set of the motor phasing windings to form a second lane, whereby to cause current to flow in the motor that meets a current demand from a current demand circuit, the method further comprising during at least one mode of operation applying voltage waveforms to one or more of the motor phase windings which cause energy to be transferred from the first direct current source of the first lane into a component of the second lane through transformer coupling between at least one phase winding of the first lane and at least one phase winding of the second lane, and wherein the at least one operating mode may be initiated in the event that a fault associated with the second direct current source of the second lane is detected.

14. The method according to claim 13 which comprises during a normal mode of operation causing current to flow through both lanes to meet an overall current demand in the motor and in the at least one mode of operation causing currents to flow that generate a positive torque in the motor from one lane and a negative torque in the motor from the other lane whilst maintaining the same overall current demand.

15. The method according to claim 13 comprising actively transferring energy from one lane to the other without affecting the current or torque of the motor by controlling the motor so that one lane is motoring at the same time the other is generating and by balancing the two to ensure there is no change in overall torque.

* * * * *